United States Patent [19]
Tsushima et al.

[11] Patent Number: 5,658,082
[45] Date of Patent: Aug. 19, 1997

[54] ROLLING CONTACT BEARING AND A METHOD OF PRODUCING THEREOF

[75] Inventors: Noriyuki Tsushima, Kuwana; Katsunori Itoh, Nishikasugai-gun, both of Japan

[73] Assignee: NTN Corporation, Osaka, Japan

[21] Appl. No.: 492,840

[22] Filed: Jun. 20, 1995

[30] Foreign Application Priority Data

Jun. 21, 1994 [JP] Japan .................................. 6-163229

[51] Int. Cl.$^6$ .................................................... F16C 19/00
[52] U.S. Cl. .......................... 384/492; 428/698; 428/469
[58] Field of Search ........................... 384/492; 428/469, 428/698

[56] References Cited

U.S. PATENT DOCUMENTS

| | | | |
|---|---|---|---|
| 4,696,581 | 9/1987 | Tsushima et al. | 384/565 |
| 4,871,268 | 10/1989 | Farumura et al. | 384/492 |
| 5,077,003 | 12/1991 | Muraoka et al. | 384/492 |

*Primary Examiner*—Archene Turner
*Attorney, Agent, or Firm*—Koda And Androlia

[57] ABSTRACT

A rolling contact bearing, in particular, a carbonitrided bearing mainly used for automobile transmissions, being intended that the steel for the bearing contains less amounts of alloy ingredients to keep its good cold working performance, that carbonitriding time is shortened to reduce production costs, and that its rolling fatigue life is extended, in particular, under lubrication with foreign elements.

At least the bearing race member of the bearing made of a medium carbon steel consisting essentially of, by weight, 0.4 to 0.8% of C, 0.4 to 0.9% of Si, 0.7 to 1.3% of Mn and 0.5% or less of Cr is formed by cold working. The bearing race member is provided with case-hardened layers thereon obtained via carbonitriding, followed by quenching and tempering. Retained austenite in the case-hardened layers is kept in the range of, by volume, 20 to 40%, and the core portion of the bearing race member has a hardness of HRC58 or less.

4 Claims, 1 Drawing Sheet

ROLLING CONTACT BEARING AND A METHOD OF PRODUCING THEREOF

FIELD OF THE INVENTION

The present invention relates to a rolling contact bearing used under lubrication with foreign elements, for example, in an automobile transmission.

PRIOR ART

In a rolling contact bearing used for an automobile transmission, powder generated from worn transmission gears suspends in a lubricant and enters between the raceway of the bearing race member and the surface of the rolling elements, such as steel balls, of the bearing, thereby causing indentations. Starting from such indentations or their depressed traces and their peripheries, the spalling of the raceway occurs and the rolling fatigue life of the bearing is shortened. For this reason, the life of the bearing is shorter than that of a bearing generally used under clean lubrication.

In the case of rolling contact bearings used under clean lubrication, the life of a rolling contact bearing made of a carburized low carbon structural steel (SCr420 steel or the like) is generally longer than that of a rolling contact bearing made of a quench hardened and then tempered high carbon chromium bearing steel (SUJ2 steel or the like). Even the carburizing treatment for the low carbon steel is insufficient for extending the life of the bearing under lubrication with foreign elements. To solve this problem, an assignee of the right to obtain a patent of the present invention already proposed a rolling contact bearing made of a low carbon carburized steel consisting essentially of 0.15 to 0.4% of C, having case-hardened layers of a certain thickness or more on the race members and rolling elements by carburizing, having a core portion with an adjusted high hardness value and capable of being used with extended life under lubrication with foreign elements (Unexamined Japanese Patent Publication Showa 62-132031).

As prior arts, a rolling contact bearing having improved wear resistance and heat resistance obtained by carbonitriding and then tempering the above-mentioned bearing steel at high temperature (Examined Japanese Patent Publication Heisei 3-56305), and a rolling contact bearing made of a carburized or carbonitrided medium-carbon, high-chromium steel (molybdenum steel) consisting essentially of 0.4 to 08% of C and adapted to the use under lubrication with foreign elements (Examined Japanese Patent Publication Heisei 6-11899) have been proposed.

These days, automobile bearings are required to be produced at lower costs, in addition to further extension of life, in particular, under lubrication with foreign elements. To meet this requirement, it is necessary to reduce the production costs of the bearings. For this purpose, it is required to develop a bearing steel based on the premise of reduced machining processes and simplified heat treatment, in which the steel can be subjected to cold rolling as well as cold forging including raceway turning, with high accuracy in the production process of race members.

In addition to the hardness of the case-hardened layer, a certain amount of retained austenite in the case-hardened layer is effective in extending the life of the bearing under lubrication with foreign elements. In this respect, it is necessary to use high carbon base material or to form a sufficient carburized or carbonitrided layer at the surface layer of a low/medium carbon steel. However, since the above-mentioned bearing steel is a high carbon steel consisting essentially of about 1% of C, it is low in cold working performance. If a low carbon steel is used, the steel has superior working performance, but it takes a long time for carburizing and carbonitriding necessary for case-hardening, thereby causing high processing costs and high heat treatment costs. Furthermore, the conventional steel includes 1% or more of Cr as an alloy ingredient. Accordingly, when an attempt is made to reduce the cost of material, there is room for decreasing the amounts of alloy ingredients.

SUMMARY OF THE INVENTION

Accordingly, the purpose of the present invention is to provide a rolling contact bearing having an extended rolling fatigue life under lubrication with foreign elements and being produced at low costs by decreasing the amounts of alloy ingredients in a steel and by adopting cold working and simplified heat treatment.

DETAILED DESCRIPTION OF THE INVENTION

Figure 1:
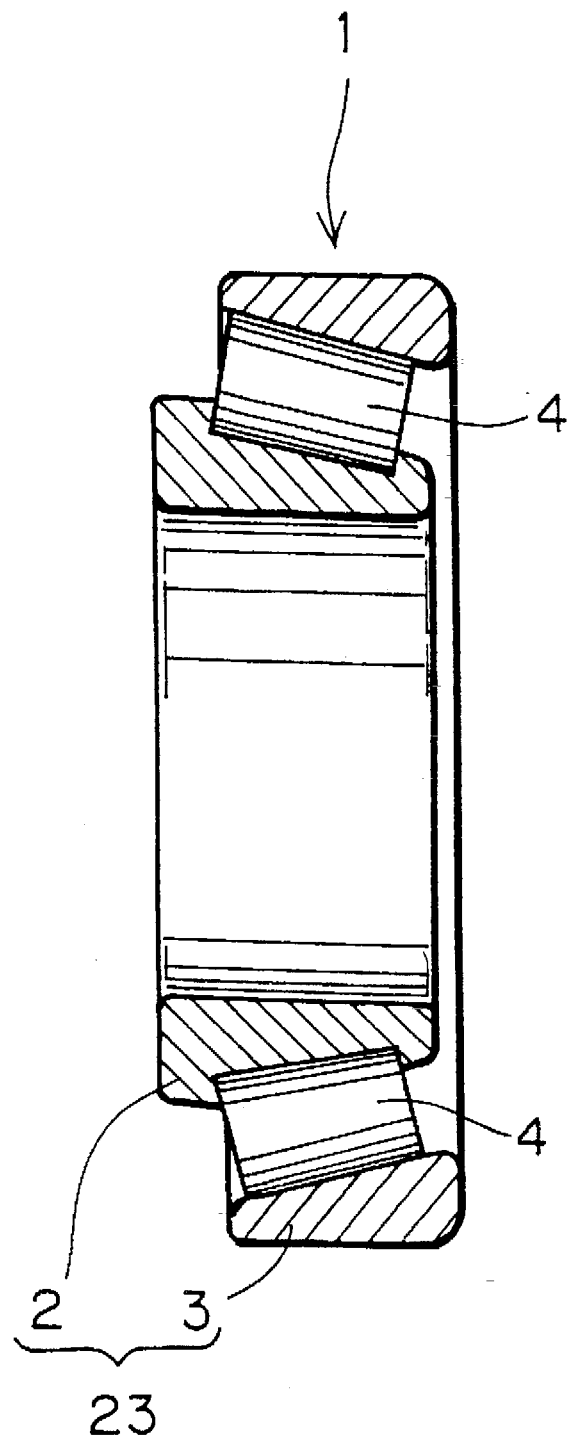
FIG. 1 is a vertical sectional view of a tapered roller bearing used for an automobile transmission, a typical rolling contact bearing of the present invention.

The present invention is detailed as follows referring to FIG. 1.

The rolling contact bearing 1 of the present invention comprising a bearing race member 23 composed of an inner race 2 and an outer race 3, and rolling elements 4 rotatably interposed between the inner and outer races, the bearing race member being at least made of a medium carbon steel consisting essentially of by weight, 0.4 to 0.8% of C, 0.4 to 0.9% of Si, 0.7 to 1.3% of Mn, 0.5% or less of Cr and the balance being Fe and unavoidable impurities, the bearing race member being also provided with case-hardened layers thereon obtained via carbonitriding followed by quenching and tempering, retained austenite in the case-hardened layers is kept in the range of 20 to 40%, and the core portion of the bearing race member has a hardness of HRC58 or less.

This kind of tapered roller bearing 1 is known to be used for an automobile transmission and encounters a spalling problem caused by indentations mentioned before which are formed by debris generated from worn transmission gears and suspending in a lubricant during operation.

The bearing race member 23 of the bearing 1 of the present invention is made of a medium carbon steel having the above-mentioned composition, and formed by cold working. Next, the bearing race member 23 is carbonitrided to form case-carbonitrided layers thereon, and finally quench hardened so that the case-carbonitrided layers are changed to case-hardened layers having a martensite structure in the matrix thereof and including a proper amount of retained austenite, then tempered at low temperature so that the amount of the retained austenite in the case-hardened layers is adjusted in the range of 20 to 40%. The core portion of the bearing race member 23 is made of the same material as the quench hardened and then tempered medium carbon steel having the above-mentioned composition, and has a hardness of HRC58 or less after tempering.

Both the bearing race member 23 and the rolling elements 4 of the rolling contact bearing 1 should preferably be made of a steel having the above-mentioned composition, and carbonitrided, quenched and then tempered so that the amount of the retained austenite in the case-hardened layers and the hardness of the core portion are adjusted in the same way as described above.

In the present invention, a medium carbon steel consisting essentially of 0.4 to 0.8% of C is carbonitrided after cold working. The range of 0.4 to 0.8% is determined because of the following reasons. If the content of C exceeds 0.8%, the steel becomes too hard when normalized, and its cold working performance at the time of forming bearing race members is lowered. As a result, sufficient working amounts and forming accuracy cannot be obtained during cold forging or the like. In particular, the content of C should preferably be 0.6% or less to obtain satisfactory cold working performance. On the other hand, if the content of C is less than 0.4%, it takes a long time to obtain a desired surface hardness and a desired amount of retained austenite by carbonitriding treatment.

Cr in the steel is included as an impurity, the amount of which is determined depending on the raw materials used and steel-making method. Even when Cr is added, the amount of Cr should be 0.5% or less. In the present invention, the amount of Cr has a low value as described above because of the following reasons. A conventional carbonitrided steel consists essentially of 1% or more of Cr and large amounts of Cr carbides and Cr nitrides are diffused minutely in the carbonitrided layers at the surface thereof to ensure satisfactory surface hardness, wear resistance and heat resistance. In the case of the present invention, the amount of nitrogen consumed to form Cr carbides and Cr nitrides is decreased, thereby increasing the amount of nitrogen diffused in the austenite matrix at the carbonitriding temperature and required to form the retained austenite in the case-hardened layers in a short carbonitriding time, and reducing the cost by decreasing the amount of Cr to be added.

The steel of the present invention consists essentially of 0.5% or less of Cr because of the following reasons. If the amount of Cr exceeds 0.5%, it is difficult to thicken diffused nitrogen contents in the carbonitrided layers of the surface layers, thereby taking a long time for the carbonitriding to form a desired amount of retained austenite in the case-hardened layers. This amount of Cr is thus undesirable. The amount of Cr should preferably be 0.3% or less. In particular, by considering the amount of Cr entered from steel raw materials, it is determined to be in the range of 0.02 to 0.3%.

In the steel of the present invention, the amount of Mn is in the range of 0.7 to 1.3%. Mn is added to ensure the hardenability of the carbonitrided layers and the core portion. If the content of Mn is less than 0.7%, the hardening performance affected by decreasing the content of Cr cannot be compensated for. If the content of Mn is more than 1.3%, cold working performance is deteriorated and the amount of retained austenite at the core portion increases since Mn stabilizes austenite, thereby adversely affecting dimensional stability.

The content of Si in the steel is determined to be in the range of 0.4 to 0.9% since Si enhances temper softening resistance to ensure heat resistance, thereby improving the rolling fatigue life of the bearing under lubrication with foreign elements. The present invention indicates that the increased amount of Si far sufficiently compensates for the insufficient heat resistance at the raceways of the bearing race members caused by the decreased content of Cr. If the content of Si is less than 0.4%, it is not effective in extending the life of the bearing. If the content of Si is more than 0.9%, the steel is hardened when normalized, thereby deteriorating the cold working performance of the steel.

As other impurities, the contents of P, S and O are decreased as low as possible. In particular, oxide inclusions are decreased so that the life is not affected by stress concentration around the oxide inclusions in the case-hardened layers. For this purpose, the content of oxygen is required to be decreased to 15 ppm or less.

When the steel having the above-mentioned composition is formed into the bearing race member and carbonitrided, carbonitrided layers including large amounts of C and N are formed on the surface. Since the steel of the present invention includes a lower content of Cr, diffusion and thickening of C and, in particular, N proceed promptly in the carbonitriding treatment, thereby effectively shortening the carbonitriding time. Since the thickened N lowers the Ms point in the quench hardening treatment and stabilizes austenite, a large amount of austenite is retained in the quench-hardened structure of the carbonitrided layers after quench hardening. This structure is tempered at a low temperature of 200° C. or less to form case-hardened layers having a hardness of HRC 60 or more. The content of the retained austenite is finally set in the range of 20 to 40%.

Even if indentations are formed on the raceways when hard foreign powder in a lubricant enters the raceways, the grains of the retained austenite distributed in the case-hardened layers are easily subjected to plastic deformation around the indentations, thereby relieving stress concentration at the indentations, retarding crack propagation and improving the rolling fatigue life. The amount of the retained austenite is adjusted in the range of 20 to 40% because of the following reasons. If the amount is less than 20%, the rolling fatigue life is not improved sufficiently. If the amount is more than 40%, the case-hardened layers have a hardness of HRC 58 or less, resulting in lowered wear resistance. This is undesirable.

On the other hand, the hardness of the core portion is adjusted to HRC 58 or less. However, the hardness should preferably be in the range of HRC 48 to 58. The hardness of the core portion should be considerably higher to offer satisfactory rolling fatigue life under lubrication with foreign elements, but the hardness should preferably be lower (HRC 58 or less) than the hardness (HRC 60 or more) of the case-hardened layers. By making the hardness of the core portion lower than that of the case-hardened layer, residual compressive stress is generated in the case-hardened layers by heat treatment. This compressive stress offsets the residual tensile stress generated around the above-mentioned indentations caused by foreign elements, thereby preventing crack generation and providing favorable effects on extending the life of the bearing.

Since the core portion corresponds to the quench hardened and then tempered structure of the medium carbon steel, the amount of the retained austenite in the core portion is far less than that in the case-hardened layers, and is less than that in the quench-hardened and then tempered high carbon bearing steel. The dimensional stability of the medium carbon steel is, therefore, better than that of the high carbon bearing steel.

To improve the dimensional stability of a carbonitrided high carbon Cr bearing steel, a conventional method has been used, wherein the steel is tempered at a high temperature of 200° C. or more to decompose the retained austenite at the core portion. For this purpose, the content of Cr must be increased to prevent the case-hardened layers from being softened by high-temperature tempering, and at the same time, a large amount of austenite must be generated to compensate for the decomposition (caused by high-temperature tempering) of the retained austenite in the case-hardened layers. To generate the large amount of austenite at the case-hardened layers, carbonitriding must be conducted for a long time in the case of the conventional method. On the other hand, since a medium carbon steel is used for the present invention, a less amount of retained austenite is generated at the core portion even when low-temperature tempering is conducted and thus the steel can easily have necessary dimensional stability. Accordingly, the steel does not require high-temperature tempering. As a result, dense carbonitriding is not necessary for the carbonitrided layers and a desired retained austenite can be obtained at the case-hardened layers (carbonitrided layers after carbonitriding).

Unlike the steel of the present invention, the conventional low carbon Cr steel includes only a small amount of retained austenite in the core portion and thus has good dimensional stability. However, it requires a long carbonitriding time to obtain a desired hardness and to form a desired amount of austenite in the case-hardened layers. In the case of the present invention, since a medium carbon steel is used, the carbonitriding time can be shortened.

Furthermore, according to the present invention since a medium carbon steel is used for the carbonitriding treatment and the content of Cr in the steel is decreased, the speed of carbonitriding is high as described above. The above-mentioned amount of the retained austenite in the case-hardened layers can, therefore, be obtained in a short time. Accordingly, the carbonitriding treatment using such a medium carbon steel is simplified more effectively than the carbonitriding treatment using a high carbon chromium bearing steel or a low carbon chromium steel.

EXAMPLES

Preparation of samples

The chemical compositions of steels A to G used for the examples of the present invention and comparison examples are shown in Table 1. Steels F and G for the comparison examples containing a low amount of Si were used to examine the effects of Si. Other than F and G, conventional SCr420 steel and SUJ2 steel were also included as comparison examples. These steels were used to form the inner and outer race members and rolling elements (balls) for the JIS 6206 ball bearings by cold working, and these members were heat-treated as described below to make ball bearings.

The carbonitriding treatment was conducted in the following three conditions:

Carbonitriding I: Carbonitriding at 850° C. for 150 minutes, and then quench hardening in oil at 100° C.

Carbonitriding II: Carbonitriding at 880° C. for 40 minutes, and then quench hardening in oil at 100° C.

Carbonitriding II is intended to examine the possibility of shortening the treatment time.

In either of the above-mentioned treatments, tempering was followed at 180° C. for 2 hours.

The conventional SCr420 steel was subjected to carbonitriding as described below as Carbonitriding III, considering that the steel was a low carbon steel, wherein the steel was carbonitrided at 950° C. for 450 minutes and heated for quenching at 850° C. for 30 minutes, and then quench-hardened in oil at 100° C. and then tempered at 180° C. for 2 hours in the same way.

Rolling life test

The bearings prepared for the examples and the comparison examples were subjected to rolling life tests in the following conditions.

Test under lubrication with foreign elements: Radial load Fr=6.9 kN, rotation speed=2000 rpm. Lubrication was performed by oil bath lubrication, wherein steel particles of 0.4 g/l were mixed as foreign elements in turbine oil (VG56).

Test under clean lubrication: Radial load Fr=12.25 kN, rotation speed=2000 rpm. Lubrication was performed by circulation lubrication of clean turbine oil (VG56).

As a conventional example, a bearing made of SUJ2 steel having been quench-hardened and then tempered in the conventional method was subjected to the same tests. By using this quench-hardened and then tempered bearing as the reference bearing, the above-mentioned examples and the comparison examples were evaluated.

TABLE 1

| Steel | Chemical composition | | | | Surface hardness | Amount[1] of γ | Hardness of core portion | Residual[5] stress | 10% life ratio | | 500° C., 1 hour | |
|---|---|---|---|---|---|---|---|---|---|---|---|---|
| | C | Si | Mn | Cr | HRC | (%) | HRC | (MPa) | Clean lubricant | of foreign elements | Inclusive Hardness after tempering HV | Heat treatment |
| Examples | | | | | | | | | | | | |
| A | 0.59 | 0.81 | 0.82 | 0.21 | 61.3 | 28 | 57.5 | −100 | 2.0 | 3.5 | 550 | Carbonitriding[2] |
| B | 0.60 | 0.50 | 0.82 | 0.21 | 61.5 | 28 | 57.5 | −100 | 2.2 | 3.2 | 570 | II |
| C | 0.55 | 0.78 | 1.21 | 0.22 | 60.9 | 25 | 57.0 | −100 | 2.0 | 3.5 | 550 | |
| D | 0.42 | 0.49 | 0.81 | 0.21 | 60.0 | 25 | 42.0 | −150 | 1.9 | 3.3 | 560 | |
| E | 0.45 | 0.50 | 0.90 | 0.48 | 60.2 | 25 | 45.0 | −150 | 1.5 | 2.0 | 560 | |
| Comparison examples | | | | | | | | | | | | |
| F | 0.57 | 0.28 | 0.81 | 0.20 | 61.3 | 27 | 57.0 | −110 | 1.1 | 1.5 | 570 | |
| G | 0.59 | 0.01 | 0.80 | 0.21 | 59.1 | 28 | 57.0 | −100 | 1.0 | 1.5 | 560 | |
| SUJ2 | 1.0 | 0.25 | 0.4 | 1.4 | 63.0 | 28 | 62.0 | −50 | 1.2 | 1.5 | 580 | |
| SCr[4] | 0.29 | 0.20 | 0.7 | 1.0 | 59.0 | 22 | 40.0 | −200 | 0.7 | 2.0 | 530 | III[4] |
| Conventional example SUJ2 steel | 1.0 | 0.25 | 0.4 | 1.4 | 62.0 | 10 | 62.0 | 0 | 1.0 | 1.0 | 450 | Hardening[3] and tempering |

[1]Amount of γ: Amount of retained austenite in case-hardened layers
[2]Carbonitriding II: Carbonitriding at 880° C. for 40 minutes, quench hardening in oil at 100° C., then tempering at 180° C. for 2 hours
[3]Quench hardening and tempering: Heating at 850° C. for 40 minutes, quench hardening in oil at 100° C., then tempering at 180° C. for 2 hours
[4]SCr420 steel (Carbonitriding III): Carbonitriding at 950° C. for 450 minutes, heating for quenching at 850° C. for 30 minutes and then quench hardening in oil of 100° C. and tempering at 180° C. for 20 hours
[5]Residual stress in case-hardened layers The test conditions and results have been summarized in Table 1. First, the content values of C and surface hardness values after carbonitriding, followed by quenching and tempering are checked. In the carbonitriding treatment conducted for a short time under the heat treatment conditions described above, 0.4% or more of C is necessary as indicated in the table to ensure the surface hardness of HRC 60 or more. On the other hand, since the increased content of C worsens the cold working performance, the preferred content of C should be in the range of 0.4 to 0.6% as in the case of the examples.

Referring to the relationship between the content of Si and the rolling fatigue life indicated in Table 1, according to the life data on steels A to E of the examples and the comparison examples F and G, it is understood that the 10% lives of the bearings containing 0.5 to 0.8% of Si are made longer twice or more than that of the conventional example (quench-hardened and tempered bearing made of SUJ2 steel) under lubrication with foreign elements. The lives of bearings with a low content of Si cannot be improved sufficiently (comparison examples F to G). Furthermore, the bearings containing 0.5 to 0.8% of Si are superior to the conventional bearing in the 10% lives even under clean lubrication.

Table 2 indicates the summary of the results obtained by examining the effects on the 10% life ratio between Carbonitriding I and Carbonitriding II (the carbonitriding time is shortened). The nitriding depth values in the table are the depth values of the high hardness regions from the surface obtained by measuring the hardness distribution after tempering at 500° C. for one hour.

Referring to Table 2, the carbonitrided steel C of the present invention can be obtained without significantly decreasing the nitriding depth even when the carbonitriding time is shortened. There is no significant difference in rolling fatigue life between Carbonitriding I and Carbonitriding II. The life of steel C is long and superior to the life of the quench-hardened and tempered steel SUJ2 and the life of the carbonitrided steel SUJ2 under the same carbonitriding conditions. In this way, it is understood that the sufficient rolling fatigue life can be obtained by a short-time carbonitriding treatment (Carbonitriding II) at 880° C. for 40 minutes for the bearings of the present invention.

TABLE 2

| Steel | Heat treatment | Nitriding depth (mm) | 10% life ratio Clean lubricant | 10% life ratio Inclusive of foreign elements |
|---|---|---|---|---|
| C | Carbonitriding I | 0.50 | 2.2 | 3.3 |
|   | Carbonitriding II | 0.40 | 2.0 | 3.5 |
| SUJ2 | Quench hardening and tempering | — | 1.0 | 1.0 |
|   | Carbonitriding I | 0.30 | 2.1 | 2.6 |
|   | Carbonitriding II | 0.25 | 1.2 | 1.5 |

Table 3 indicates the results of secular dimensional stability for the carbonitrided steel C of the present invention, and the quench-hardened and tempered conventional steel SUJ2. According to long-time dimension measurement results at 120° C., the dimensional change of the carbonitrided steel C is less than half of the quench-hardened and tempered steel SUJ2. This is a significant improvement in dimensional stability. Dimensional change is caused by the decomposition of the retained austenite during bearing operation. The case-hardened layers of the carbonitrided steel C include a large amount of retained austenite since austenite is stabilized by an increased amount of N, while the core portion (major volumetric portion) has almost the same structure as that of the quench-hardened medium carbon steel, therefore the core portion has a less amount of retained austenite than that included in the quench-hardened and tempered steel SUJ2. As a result, the dimensional stability of the core portion can be improved.

TABLE 3

Dimensional change ratio at 120° C. ($\times 10^{-5}$)

| Steel | Heat treatment | Duration (h) 100 | 500 | 1000 | 2500 |
|---|---|---|---|---|---|
| SUJ2 | Quench hardening and tempering | 4 | 12–30 | 19–40 | 29–56 |
| C | Carbonitriding II | 1.5 | 3–12 | 8–16 | 12–23 |

Next, the carbonitrided steel C of the present invention and the quench-hardened and tempered conventional steel SUJ2 were tested in terms of corrosion resistance. In the test, 18 samples were prepared for either of the steels. After the steel surfaces were ground with #320 emery paper, rust preventive oil was applied to the ground surfaces. Next, the rust preventive oil was wiped off, and then rust generation on the surfaces was observed after distilled water was put on the surfaces.

The rust generation ratio was indicated by the ratio of the quantity of rusted samples to the quantity of all tested samples. In the case of the quench-hardened and tempered conventional steel SUJ2, the ratio is 67%. On the other hand, in the case of the carbonitrided steel C of the present invention, the ratio is 9%. It is thus found that the carbonitrided steel of the present invention is also superior to the conventional material in rust prevention. The improvement in the rust prevention of the carbonitrided steel is caused by thickening of N at the surface layers.

Since the rolling contact bearing of the present invention made of a medium carbon steel consisting essentially of 0.4 to 0.8% of C includes a less amount of Cr and thus increases the relative amount of nitrogen diffused when carbonitrided, a desired surface hardness and a desired amount of retained austenite in the case-hardened layers can be obtained even if the carbonitriding time is shortened. By adding Si, the bearing can have higher heat resistance. The bearing is not only superior in the rolling fatigue life under lubrication with foreign elements but also under clean lubrication.

In addition, since the bearing can be cold-worked easily, since the material cost required for adding alloy elements can be reduced, and since the carbonitriding time can be shortened, the bearing production cost can be reduced effectively.

We claim:

1. A rolling contact bearing, mainly used under lubrication with foreign elements, comprising:

a bearing race member composed of an inner race and an outer race, and rolling elements rotatably interposed between the inner and outer races; and wherein at least said bearing race member is made of a medium carbon steel consisting essentially of, by weight, 0.4 to 0.8% of C, 0.4 to 0.9% of Si, 0.7 to 1.3% of Mn, 0.5% or less of Cr and the balance being Fe and unavoidable impurities;

said bearing race member is provided with case-hardened layers thereon obtained via carbonitriding, following by quenching and tempering, retained austenite in the case-hardened layers being kept in the range of, by volume, 20 to 40%;

a core portion of said bearing race member having a hardness of HRC45 or less; and the hardness of the core portion is lower than that of the case-hardened layer for generating residual compressive stress in the case-hardened layer.

2. A rolling contact bearing according to claim 1, wherein the case-hardened layers have a hardness of HRC 60 or more.

3. A rolling contact bearing according to claim 1, wherein the medium carbon steel consists essentially of, by weight, 0.4 to 0.6% of C, 0.5 to 0.8% of Si, 0.7 to 1.3% of Mn, 0.02 to 0.3% of Cr and the balance being Fe and unavoidable impurities.

4. A rolling contact bearing according to claim 1, wherein the content of oxygen in the medium carbon steel is 15 ppm or less.

* * * * *